United States Patent [19]

Keller et al.

[11] Patent Number: 5,744,556

[45] Date of Patent: Apr. 28, 1998

[54] GAS PHASE POLYMERIZATION EMPLOYING UNSUPPORTED CATALYSTS

[75] Inventors: George Ernest Keller, South Charleston; Keith Ernest Carmichael, Charleston; Jean Bowman Cropley, Scott Depot; Eldon Ronald Larsen, Charleston, all of W. Va.; Arakalud Venkatapathia Ramamurthy, East Windsor; Mark Wilton Smale, Glen Gardner, both of N.J.; Timothy Todd Wenzel; Clark Curtis Williams, both of Charleston, W. Va.

[73] Assignee: Union Carbide Chemicals & Plastics Technology Corporation, Danbury, Conn.

[21] Appl. No.: 712,930

[22] Filed: Sep. 13, 1996

Related U.S. Application Data

[60] Provisional application No. 60/004,283 Sep. 25, 1995.

[51] Int. Cl.$^6$ .......................................... C08F 2/34
[52] U.S. Cl. ........................... 526/135; 526/138; 526/160; 526/348.2; 526/348.4; 526/348.5; 526/348.6; 526/351; 526/352; 526/901; 526/943
[58] Field of Search ............................... 526/135, 160, 526/348.2, 348.4, 348.5, 348.6, 351, 352, 901

[56] References Cited

U.S. PATENT DOCUMENTS

| | | |
|---|---|---|
| 4,582,731 | 4/1986 | Smith . |
| 4,734,227 | 3/1988 | Smith . |
| 4,734,451 | 3/1988 | Smith . |
| 4,826,699 | 5/1989 | Soe . |
| 4,916,108 | 4/1990 | McLaughlin et al. . |
| 5,290,827 | 3/1994 | Shine . |
| 5,317,036 | 5/1994 | Brady, III et al. .............. 523/223 |
| 5,326,835 | 7/1994 | Ahvenainen et al. . |
| 5,391,654 | 2/1995 | Ahvenainen et al. . |
| 5,464,154 | 11/1995 | Nielsen ............................. 239/1 |

FOREIGN PATENT DOCUMENTS 1176437  7/1989  Japan .

OTHER PUBLICATIONS

Dixon, et al, "Polymeric Materials Formed by Precipitation with a Compressed Fluid Antisolvent", *AIChE Journal*, 39, No. 1, 127–139, 1993.

*Primary Examiner*—David W. Wu
*Attorney, Agent, or Firm*—P. W. Leuzzi, II

[57] ABSTRACT

A process for the gas-phase polymerization of polymers which allows for the introduction of an unsupported polymerization catalyst system into the gas-phase reactor, wherein the unsupported polymerization catalyst system comprises (i) a non-volatile materials fraction containing a polymerization catalyst; (ii) a solvent fraction which is at least partially miscible with the non-volatile materials fraction and which is sufficiently volatile to allow for the formation of polymerization catalyst particles when the mixture of the solvent fraction and the non-volatile materials fraction is sprayed into the reactor; (iii) a compressed fluid; and (iv) optionally a slowly vaporizing solvent.

15 Claims, No Drawings

GAS PHASE POLYMERIZATION EMPLOYING UNSUPPORTED CATALYSTS

This application claims the benefit of U.S. Provisional application No. 60/00,4283 filed Sep. 25, 1995.

FIELD

The present invention relates to a gas-phase polymerization employing unsupported catalysts. More specifically, this invention relates to the use of supercritical or highly compressed fluids as the means for introducing unsupported catalysts into the gas phase system.

BACKGROUND

The introduction of catalysts into a gas-phase polymerization reactor is a complex and important mechanism in the overall process. The mechanism must take into account not only the chemical reactions that are initiated when the catalyst meets the monomers, but also the engineering aspects of how this delivery mechanism occurs. In the area of polyolefin chemistry this has generated discoveries on various methods of supporting the catalyst as well as on the design of delivery nozzles. The rationale behind these discoveries is based, in large part, on the supposition that the support provides a template for growth of the polymer particles leading to desirable product morphology, and that it acts to minimize operating problems associated with the introduction of non-solid catalyst particles.

Catalysts have been impregnated onto supports such as silica and introduced into a reactor in which a gas-solid polymerization is being carried out. The catalyst support, as well as possibly other solids in the formulation, are permanently incorporated into the resin and can prove to be detriments to certain resin properties. For example, film clarity can be reduced by the presence of excessive amounts of solids in the resin. In addition, the use of a catalyst support can lead to catalyst sites which have different chemical properties and therefore lead to the formation of different polymers compared to polymers being formed at other catalyst sites. As a consequence, the resulting resin is a mixture of different polymers made at the different sites. The use of a non-supported catalyst obviates the problems caused by the presence of a catalyst support and represents a new technology for catalyst introduction into a polymerization reactor.

Recently, in the area of polymerization chemistry, catalysts have been discovered with very high activity which, if ultimately translated into productivity, have the potential of enhancing polymerization processes. The catalysts formed from transition metal compounds and aluminoxanes as proposed in these references have much higher activity than polymerization catalyst systems formed from transition metal compounds and organoaluminum compounds previously used. Most of these catalyst systems are soluble in the reaction systems and are used in a solution polymerization system. As a result, the viscosity of the polymer solution becomes very high, the polymer obtained by after-treatment of the solution has a low bulk density, and it is difficult to obtain polymers having excellent characteristics.

On the other hand, attempts have also been made to polymerize olefins in a suspension polymerization system or a gas-phase polymerization system by using catalysts comprising the above transition metal compounds, or the aluminoxane or both supported on a porous inorganic oxide carrier such as silica, silica-alumina or alumina. See for instance U.S. Pat. Nos. 4,897,455; 4,937,301; 5,147,949; and 5,373,072.

Attempts have also been reported to eliminate the inorganic carrier remaining as foreign matter in the resulting polymer as is obtained with conventional catalysts supported on inorganic carriers. See U.S. Pat. No. 4,923,833 wherein a solid fine particle catalyst is used without a support.

Recently, some of these catalysts have been found to retain their high activity when fed as a solution to the reactor (See U.S. Pat. No. 5,317,036). In addition, recent discoveries have indicated that in gas phase polymerizations, not only is it possible to operate in the condensing mode (See U.S. Pat. Nos. 4,543,399 and 4,588,790), but liquid monomer addition can also advantageously be employed under certain circumstances (U.S. Pat. No. 5,453,471). These factors have conspired to make the use of liquid catalysts more important in gas phase polymerizations than ever before, and thus the need to overcome the inherent problems associated with feeding an unsupported catalyst into a gas-phase polymerization.

The use of compressed fluids for new applications has become a major area for scientific research, primarily in the areas of solvents for effecting various separations, formulations and technology for delivery of coatings (see U.S. Pat. Nos. 4,916,108; 5,326,835; and 5,391,654).

The use of a supercritical fluid or compressed fluid as part of the catalyst formulation is a superior means of introduction of the catalyst into the reactor which has unexpectedly been found to solve many of the problems associated with the addition of an unsupported catalyst in a gas phase polymerization.

SUMMARY OF THE INVENTION

The instant invention provides for a process for a gas-phase polymerization of polymers which process comprises introducing the monomer or monomers and an unsupported polymerization catalyst system into a gas-phase reactor, wherein the unsupported polymerization catalyst system comprises a non-volatile materials fraction containing the polymerization catalyst; a solvent fraction which is at least partially miscible with the non-volatile materials fraction and which is sufficiently volatile to form polymerization catalyst particles when sprayed; a highly compressed fluid; and optionally a slowly vaporizing solvent; and recovering the polymer product. It is possible that when a cocatalyst is employed, such as an aluminoxane, it can be fed into the reactor in a non-highly compressed fluid such as in the monomer feed. The catalyst particles that are formed can exist either as solid particles or as liquid droplets wherein the solid particle is wetted with the solvent or even where the catalyst is still in solution.

The use of supercritical fluids or compressed fluids as part of the catalyst formulation provides a powerful means of introducing unsupported catalysts for polymerization in a gas-phase reactor, such as a UNIPOL® polyolefins reactor. It has been discovered that the use of a of a compressed or supercritical fluid produces a dramatically superior spray pattern of droplets into the gas phase reactor, which form new polymer particles as well as intercepts growing particles thereby adding to their growth. Specifically, the compressed fluid spray has a much narrower droplet-size distribution. The major portion of the droplets are small in size. Surprisingly, these small droplets do not form dust particles but rather yields a narrow distribution of polymer particle size.

DETAILED DESCRIPTION OF THE INVENTION

In accordance with the present invention there is provided a new and powerful means of introducing unsupported catalysts in a gas-phase reactor.

As the temperature of a pure liquid is raised, this liquid becomes a vapor. Thus, water, when heated at one atmosphere, becomes steam at 100° C. If the pressure is raised, then water will not turn to steam until it reaches a higher temperature. Increasing the pressure further will produce higher and higher temperatures at which the liquid water will turn to steam. However, this situation has a limit. At 3208.2 psia and 374.15° C., water reaches what is called its critical point. At this point, the vapor (steam) and liquid densities are equal. In addition, if the temperature is increased beyond 374.14° C., it is impossible to produce a liquid phase no matter how much pressure is applied. The temperature of 374.14° C. is called the critical temperature of water, and 3208.2 psia is called the critical pressure.

As used herein, it will be understood that a "compressed fluid" is a fluid which may be in its gaseous state, its liquid state, or a combination thereof, or is a supercritical fluid, depending upon (i) the particular temperature and pressure to which it is subjected, (ii) the vapor pressure of the fluid at that particular temperature, and (iii) the critical temperature and critical pressure of the fluid, but which is in its gaseous state at standard conditions of 0° Celsius temperature and one atmosphere absolute pressure (STP). As used herein, a "supercritical fluid" is a fluid that is at a temperature and pressure such that it is at or above its critical point.

Compounds which may be used as compressed fluids in the present invention include, but are not limited to, carbon dioxide, nitrous oxide, ammonia, xenon, ethane, ethylene, propane, propylene, butane, isobutane, chlorotrifluoromethane, monofluoromethane, and mixtures thereof. In Table 1 are listed a number of normally gaseous materials along with their critical temperatures and pressures. It should be noted that, in general, the lower the normal boiling point of the material, the lower its critical temperature. Preferably, the compressed fluid has a critical temperature greater than 273K and less than 505K.

TABLE 1

EXAMPLES OF SUPERCRITICAL FLUIDS

| Compound | Boiling Point °C. | Critical Temp. °C. | Critical Pressure atm | Critical Density g/ml |
|---|---|---|---|---|
| Ethylene | −103.7 | 9.2 | 49.7 | 0.22 |
| Xenon | −108.2 | 16.6 | 57.6 | 0.12 |
| Chlorotrifluoro-ethane | −31.2 | 28.0 | 38.7 | 0.58 |
| Carbon dioxide | −78.5 | 31.3 | 72.9 | 0.45 |
| Ethane | −88.6 | 32.3 | 48.1 | 0.20 |
| Nitrous oxide | −88.6 | 36.5 | 71.7 | 0.45 |
| Monofluoro-methane | −78.4 | 44.6 | 58.0 | 0.3 |
| Propane | −42.1 | 96.7 | 41.9 | 0.22 |
| Ammonia | −33.4 | 132.4 | 112.5 | 0.24 |

Of the compounds listed in Table 1, carbon dioxide is most often mentioned in illustrations of the use of compressed fluids in various separation and other processes. For instance, the UNICARB™ supercritical spray coating process typically uses carbon dioxide. However, for many catalysts, carbon dioxide may either partially or completely poison the catalyst. Therefore, it may be the case that another fluid will be used when delivering such catalysts. The fluid can either be an inert or a reactive monomer or other intermediate. Examples of inert fluids are ethane and propane. Examples of reactive fluids are ethylene and propylene. It should be noted that the catalyst and cocatalyst, such as metallocene and aluminoxane, cannot be together in the reactive fluids without initiating polymerization. The compressed fluid chosen should exist as a vapor at the pressure and temperature of the reactor. The utility of any of the above-mentioned compressed fluids in the practice of the present invention will depend upon the catalyst being delivered, the temperature and pressure of the reactor, and the inertness and stability of the compressed fluid.

The catalyst formulation is essentially a solvent-borne composition. The solvent-borne catalyst is generally comprised of (1) a non-volatile materials fraction containing the polymerization catalyst system which is capable of forming particles when sprayed; and (2) a solvent fraction which is at least partially miscible with the non-volatile materials fraction and which is sufficiently volatile to render said solvent-borne catalysts capable of forming particles when sprayed. Generally, this occurs through solvent evaporation, however there are times when less than 100% of the solvent evaporates, i.e. the polymerization catalyst remains as a fine liquid droplet. The desired spray is a decompressive spray, although that is not strictly critical to obtain the advantages of the present invention.

In general, the non-volatile materials fraction is the fraction of the solvent-borne catalyst that remains after the solvent fraction has evaporated and therefore it is the fraction that forms the particles. Suitable non-volatile materials fractions may include, but need not be limited to, metallocene catalysts, other single site catalysts, Ziegler Natta catalysts, aluminoxanes, borates, organoaluminium cocatalysts, and other components generally present in a catalytic system. An illustrative list of such suitable catalysts include: bis(cyclopentadienyl)zirconium dichloride/methylalumoxane; bis(indenyl) zirconium dichloride/methylalumoxane; bis(butylcyclopentadienyl)zirconium dichloride/methylalumoxane, titanium trichloride/triethylaluminum. The nonvolatile materials fraction may be delivered as a solution, emulsion, dispersion, or suspension in the solvent fraction. Preferably, the nonvolatile materials fraction will be delivered as a solution. In general, divided solids that are dispersed should have particle sizes that are sufficiently small to maintain a dispersed state and to pass readily through the delivery nozzle orifice. Divided solids with particle sizes too large to maintain a stable dispersion may be used if a dispersion or suspension can be formed and maintained by agitation.

The nonvolatile materials fraction should generally be greater than about 0.01% by weight of the solvent-borne catalyst, preferably greater than about 0.05%, more preferably greater than about 0.1%, and most preferably greater than about 1%. The nonvolatile materials fraction must not be so excessively high a fraction that it renders the solvent-borne catalyst unable to form a substantially decompressive spray or to form a suitable particulate size. The suitable upper limit will depend upon the physical and chemical characteristics, such as molecular-weight and solubility, of the particular nonvolatile materials fraction chosen. The non-volatile materials fraction should generally be less than about 70%, more preferably less than about 50%, and most preferably less than about 40%.

In general, the solvent fraction preferably is less than about 99% by weight of the solvent-borne catalyst, more preferably less than 60%, and most preferably less than 50%. The solvent should be fast evaporating. A fast evaporating solvent generally has a boiling point between 225K and 400K. The solvent is chosen to be at least partially miscible with the nonvolatile materials fraction and to be sufficiently volatile. Higher solubility is preferred. The solvents are preferably compatible with preserving the catalyst activity and stability of the catalyst material. Suitable solvents include, but are not limited to, i-pentane, higher boiling monomers such as hexanes and octanes, and solvents (other than oxygenated solvents) with carbon numbers up to 8. In some cases, a catalyst exists in a hyperactive state in the first seconds or minutes of its life. In general, the compressed fluid will have completely vaporized from the droplet before this early stage of hyper-activity is over, leaving the catalyst particle susceptible to overheating and deactivation. This problem can be overcome by adding to the formulation a relatively slow-vaporizing solvent. A slow evaporating solvent generally has a broiling point above 400K. Typical slow evaporating solvents include, but not limited to, solvents with carbon numbers above 8, oxo-alkanes with $C_2$ or greater, higher boiling monomers, and mineral oil. This solvent forms a diffusion barrier for monomer to reach the catalyst and also increases the external area of the droplet. These effects slow down the reaction and increase the heat-transfer rate from the droplet, thereby mitigating the problem of hyper-activity. The amount of slow solvent, if any, can vary up to about 70 weight percent, based upon the total weight of the compressed fluid, solvent-borne catalyst and slow solvent, preferably from about 0 to 60% and most preferably from about 0 to 50%.

For spraying, the solvent-borne catalyst is first admixed with at least one compressed fluid to form a liquid mixture in a closed system, the compressed fluid being in an amount which renders the liquid mixture capable of forming a-substantially decompressive spray. In general, the solvent borne catalyst is between 0.01 to 99.99 weight percent of the total weight of the compressed fluid and solvent borne catalyst, preferably 0.05 to 75 weight percent and most preferable between 0.1 to 40 weight percent. The liquid mixture is then sprayed at a temperature and pressure that gives a substantially decompressive spray by passing the mixture through an orifice into the reactor where particles are formed. As noted above, some of the liquid solvent may remain either wetting the surface of the solid particle or even placing the catalyst in solution in a fine particle droplet. Substantially decompressive sprays generally form within a relatively narrow range of combinations of compressed fluid concentration and spray temperature and pressure, which varies with the characteristics of the particular solvent-borne catalyst. Important characteristics are the composition and amount of the nonvolatile materials fraction, the composition of the solvent, and the composition of the compressed fluid used. Therefore, the conditions suitable for forming the substantially decompressive spray generally must be determined experimentally for any given spray mixture and orifice. However, the decompressive spray region generally should be below solubility limit of the compressed fluid in the solvent-borne catalyst as it changes with temperature and pressure, as disclosed in copending U.S. patent application Ser. No. 129,256, filed Sep. 29, 1993, now U.S. Pat. No. 5,464,154. At constant pressure, the solubility decreases at higher temperature. The solubility increases with higher pressure. The decompressive spray region generally occurs at a compressed fluid concentration that is somewhat below the solubility limit, often being within about five weight percentage points of it or less. Frequently spraying is done just below the solubility limit. A sufficiently high spray pressure is used to obtain a sufficiently high solubility. The spray temperature and compressed fluid concentration are then adjusted to give a decompressive spray having the desired droplet size. The solubility will also change with the compressed fluid used. The solubility will also change with the level of nonvolatile materials fraction, being lower for a higher solids content. At compressed fluid concentrations above the solubility limit, at higher pressures the liquid mixture generally comprises a liquid nonvolatile materials phase and a liquid compressed fluid phase containing extracted solvent, whereas at lower pressures the excess compressed fluid forms a gaseous phase.

In general, the amount of compressed fluid used will be from about 1 to 99.99% by weight, based upon the total weight of compressed fluid and solvent-borne catalyst, preferably about 3 to 99.95% and most preferably from about 5 to 99.9%. The amount of compressed fluid may exceed the solubility limit if desired, but it should not be so excessively high that the excess compressed fluid phase unduly interferes with spray formation, such as by not remaining well dispersed in the liquid mixture or giving poor atomization. If desired, excess compressed fluid can be used to separate a portion of the solvent from the spray mixture prior to spraying, by using the methods disclosed in U.S. Pat. No. 5,290,604. Generally the liquid mixture will contain less than about 60% by weight of the compressed fluid.

Although spray pressures of up to 10,000 psig and higher may be used, preferably the spray pressure of the liquid mixture is below about 5000 psig, more preferably below about 3000 psig. Very low pressure is generally not compatible with high compressed fluid solubility in the solvent-borne catalyst, and with the superatmospheric pressures generally encountered in gas-phase polymerizations.

The compressed fluid is preferably a supercritical fluid at the temperature and pressure at which the liquid mixture is sprayed. Although higher spray temperature is favored for more rapid solvent evaporation from the spray, the temperature must be compatible with maintaining catalyst activity, because some catalyst materials are sensitive to heat, particularly when in solvent. Therefore, the lowest spray temperature that gives a desirable decompressive spray and proper solvent evaporation is generally preferred. The temperature level that may be utilized will in general depend upon the characteristics of the solvent-borne catalyst, such as stability and heat sensitivity. Reactive systems must generally be sprayed at lower temperature than non-reactive systems. Preferably, the spray temperature of the liquid mixture is between about 0° to 130° C., more preferably between about 20° to 100° C., and most preferably between about 30° to 85° C. In order to increase the evaporation rate of solvent from the spray, the liquid mixture is preferably heated to a temperature that substantially compensates for the drop in spray temperature that occurs due to expansion cooling of the decompressing compressed fluid. Substantially decompressive sprays can generally be formed over a range of temperatures by varying the amount of compressed fluid accordingly as the solubility varies. In order to evaporate solvent more rapidly from the spray to form particles, it is desirable for a higher spray temperature to be used. The spray temperature should be sufficiently high to provide sufficiently fast solvent and compressed fluid evaporation for the average relative evaporation rate of the solvent fraction used and the amount of solvent that must be evaporated. Generally a higher spray temperature is preferred for a lower average relative evaporation rate.

The catalysts particles formed by the methods of the present invention desirably have an average particle size in the range of about 0.1 to 20 microns, preferably in the range of about 5 to 15 microns. The most favorable particle size will depend upon the specific polymerization being conducted and the catalyst system chosen. In general, narrow particle size distributions are preferred.

Typically, the catalyst contains at least one transition metal compound. It is believed that the present invention will find exceptional utility with that class of catalysts known as metallocenes. Some preferred catalyst systems include: bis-n-butylcyclopentadienyl zirconium dichloride, indenyl zirconium diethyl carmbamate, or indenyl zirconium pivalate. Preferred cocatalysts include MAO (methyl alumoxane) or modified MAO, which consists of methyl alumoxane with a fraction of the methyl alkyl groups having been replaced with isobutyl groups. The preferred solvent for MAO is toluene and that for MMAO is isopentane. The preferred slow solvent is propylene or a mineral oil. The compressed fluid is preferably ethane or propane.

Preferably the catalyst system should consist of only one phase at the pressure and temperature at the inlet to the delivery nozzle, but as it passes through the delivery nozzle, it is possible for a second phase to form, as well as the desired gas phase.

An orifice is a hole or an opening in a wall or housing, such as in a delivery nozzle. Spray orifices, spray tips, spray nozzles, spray guns and capillary tubing are generally suitable for spraying the liquid mixtures of the present invention. Delivery nozzles that do not have excessive flow volume between the orifice and the valve that turns the spray on and off and that do not obstruct the wide angle at which the spray typically exits the spray orifice are preferred. Orifice sizes of from about 0.001-inch to about 0.0625-inch nominal diameter are preferred, although smaller and larger orifice sizes may be used. Presently, commercial products only go down to 0.003 inch diameters, but it is believed lower diameters will also be useful. Devices and flow designs, such as pre-orifices or turbulence promoters, that promote turbulent or agitated flow in the liquid mixture prior to passing the mixture through the orifice may also be used. The pre-orifice preferably does not create an excessively large pressure drop in the flow of liquid mixture. The spray pattern may be a circular spray such as is produced from a round orifice or it may be an oval or flat spray as produced by a groove cut through the orifice, as aforementioned. For particularly viscous solvent-borne compositions or for high relative evaporation rates, a more oval or circular spray may be desirable to minimize polymer buildup on the spray tip. Another design has two intersecting grooves cut through the orifice outlet at right angles to each other. This produces two intersecting spray fans which produce a more axisymmetric spray pattern which gives better mixing of ambient gas into the spray interior than a circular orifice.

The pressure in the gas phase reactor must be substantially lower than the spray pressure in order to obtain sufficient decompression of the compressed fluid to form the decompressive spray. The reactor should contain sufficiently low partial pressures for the highly compressed fluid contained in the solvent-borne composition in order to promote sufficiently rapid evaporation of the solvent from the spray. Very low partial pressures are preferred. Nonetheless, the present invention can be operated in the condensed mode and super condensing mode.

The decompressive spray produces a uniform spray pattern with a narrow particle size distribution. Not only can the particle size distribution be narrow at a point in the spray, but the average particle size can be very uniform across the spray pattern, which gives a narrow overall particle size distribution for the entire spray, because some regions are not over-atomized or under-atomized. Nonuniform atomization is frequently a problem with conventional spray methods.

The gas phase polymerization reaction is conducted by contacting a stream of the monomer(s), in a gas phase process, such as in the fluid bed process described below, and substantially in the absence of catalyst poisons at a temperature and at a pressure sufficient to initiate the polymerization reaction. Although it is believed that the present invention will be suitable for all gas phase polymerizations, it is considered particularly useful when the monomer or monomers are $C_2$ to $C_{10}$ linear or branched alkenes, dialkenes or trialkenes. Most preferably the monomers are selected from the group consisting of ethene, propene, butene, pentene, hexene, octene and 1,3-butadiene.

A fluidized bed reaction system which can be used in the practice of the process of the present invention has a reactor consisting of a reaction zone and a velocity reduction zone.

The reaction zone comprises a bed of growing polymer particles, formed polymer particles and a minor amount of catalyst particles fluidized by the continuous flow of polymerizable and modifying gaseous components in the form of make-up feed and recycle gas through the reaction zone. To maintain a viable fluidized bed, the mass gas flow rate through the bed must be above the minimum flow required for fluidization, and preferably from about 1.5 to about 10 times Gmf and more preferably from about 3 to about 6 times Gmf. Gmf is used in the accepted form as the abbreviation for the minimum mass gas flow required to achieve fluidization, C. Y. Wen and Y. H. Yu, "Mechanics of Fluidization", Chemical Engineering Progress Symposium Series, Vol. 62, p. 100–111 (1966).

It is essential that the bed always contains particles to prevent the formation of localized "hot spots" and to entrap and distribute the catalyst throughout the reaction zone. On start up, the reactor is usually charged with a base of particulate polymer particles before gas flow is initiated. Such particles may be identical in nature to the polymer to be formed or different therefrom. When different, they are withdrawn with the desired formed polymer particles as the first product. Eventually, a fluidized bed of the desired polymer particles supplants the start-up bed.

Fluidization is achieved by a high rate of gas recycle to and through the bed, typically in the order of about 50 times the rate of feed of make-up gas. The fluidized bed has the general appearance of a dense mass of viable-particles in possible free-vortex flow as created by the percolation of gas through the bed. The pressure drop through the bed is equal to or slightly greater than the mass of the bed divided by the cross-sectional area. It is thus dependent on the geometry of the reactor.

Make-up gas is fed to the bed at a rate equal to the rate at which particulate polymer product is withdrawn. The composition of the make-up gas is determined by a gas analyzer positioned above the bed. The gas analyzer determines the composition of the gas being recycled and the composition of the make-up gas is adjusted accordingly to maintain an essentially steady state gaseous composition within the reaction zone.

To insure complete fluidization, the recycle gas and, where desired, part of the make-up gas are returned over a gas recycle line to the reactor at a point below the bed. A gas distribution plate above the point of return can be employed to aid fluidizing the bed.

The portion of the gas stream which does not react in the bed constitutes the recycle gas which is removed from the polymerization zone, preferably by passing it into a velocity reduction zone above the bed where entrained particles are given an opportunity to drop back into the bed.

The recycle gas is then compressed in a compressor and then passed through a heat exchanger wherein it is stripped of heat of reaction before it is returned to the bed. Note condensing mode (cite). The temperature of the bed is controlled at an essentially constant temperature under steady state conditions by constantly removing heat of reaction. No noticeable temperature gradient appears to exist within the upper portion of the bed. A temperature gradient will exist in the bottom of the bed, between the temperature of the inlet gas and the temperature of the remainder of the bed. The recycle is then returned to the reactor at its base and to the fluidized bed through distribution plate. The compressor can also be placed downstream of the heat exchanger.

The distribution plate plays an important role in the operation of the reactor. The fluidized bed contains growing and formed particulate polymer particles as well as catalyst. As the polymer particles are hot and possibly active, they must be prevented from settling, for if a quiescent mass is allowed to exist, any active catalyst contained therein may continue to react and cause fusion. Diffusing recycle gas through the bed at a rate sufficient to maintain fluidization throughout the bed is, therefore, important. The distribution plate serves this purpose and may be a screen, slotted plate, perforated place, a plate of the bubble cap type and the like. The elements of the plate may all be stationary, or the plate may be of the mobile type as disclosed in U.S. Pat. No. 3,298,792. Whatever its design, it must diffuse the recycle gas through the particles at the base of the bed to keep the bed in a fluidized condition, and also serve to support a quiescent bed of resin particles when the reactor is not in operation. The mobile elements of the plate may be used to dislodge any polymer particles entrapped in or on the plate.

It is essential to operate the fluid bed reactor at a temperature below the sintering temperature of the polymer particles to insure that sintering will not occur. For the production of ethylene homopolymers and copolymers an operating temperature of about 0° C. to 150° C., preferably about 10° C. to 140° C., and most preferably about 30° C. to 115° C. is generally employed.

The fluid bed reactor is operated at pressures of up to about 1000 psi, and is preferably operated at a pressure of from about 50 to 700 psi, preferably about 100 to 600 psi, and most preferably from about 150 to 350 psi, with operation at the higher pressures in such ranges favoring heat transfer since an increase in pressure increases the unit volume heat capacity of the gas.

The catalyst is injected into the reactor at a rate equal to its consumption. The catalyst can be injected either into the fluidized bed or above or below the bed, depending on the nature of the catalyst system being sprayed. Placement of the injection should be such that it does not interfere with the flow pattern in the bed. Preferably, this will be at a location above the distributor plate. Approximately one-quarter to one-half of the catalyst particles should form primary, or new, resin particles to maintain the desired resin particle size distribution. Feeding the catalyst above the bed provides a longer time for the catalyst particles to dry before intercepting already-existing resin particles. Additionally, feeding the catalyst into the bed but first through a tube leading to the reactor which gives time for the particles to become substantially devoid of solvent can also be employed.

The production rate of the bed is controlled by the rate of catalyst injection. The production rate may be increased by simply increasing the rate of catalyst injection and decreased by reducing the rate of catalyst injection.

Since any change in the rate of catalyst injection will change the rate of generation of the heat of reaction, the temperature of the recycle gas entering the reactor is adjusted upwards or downwards to accommodate the change in rate of heat generation. This insures the maintenance of an essentially constant temperature in the bed. Complete instrumentation of both the fluidized bed and the recycle gas cooling system is, of course, necessary to detect any temperature change in the bed so as to enable the operator to make a suitable adjustment in the temperature of the recycle gas.

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a measurement of the temperature rise of the gas across the reactor (the difference between inlet gas temperature and exit gas temperature) is determinative of the rate of particulate polymer formation at a constant gas velocity.

The particulate polymer product is preferably continuously withdrawn at a point at or close to the distribution plate and in suspension with a portion of the gas stream which is vented as the particles settle to minimize further polymerization and sintering when the particles reach their ultimate collection zone. The suspending gas may also be used to drive the product of one reactor to another reactor.

EXAMPLE

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

Example 1. Use of a Spray Gun as the Spray Delivery Nozzle. Compressed Fluid Example A spray gun, model AA24AUA-8930-36 from Spraying Systems Co. in Wheaton, Ill., with a 0.007" inch oriface, model TP400008TC, as installed into the side of a 14" diameter gas phase reactor approximately 4 inches about the distributor plate and projecting 1–3 inches into the reactor with a fan spray perpendicular to the direction of monomer flow, i.e., the fan spray was horizontal with the monomer flow vertical through the bed. The reactor was initially filled with a started bed of polyethylene resin an 220 psi partial pressure of monomer and 4 psi hexene.

The spray delivery apparatus was initially filled with a 0.004 wt % indenyl tert-butyl corboxylate zirconium and 0.21 wt % modified methyl alumoxane catalyst, 0.1 wt % hexane, 2.6 wt % ethane and the bulk isopentene. As the run progressed, and the initial catalyst charge was administered into the reactor, subsequent charges to the spray delivery apparatus which approximated the initial charge were added.

The pressure of the spray delivery apparatus was set at 1000 psig and the temperature was uncontrolled at ambient temperature and was between 298K and 308K during the run. The resin that was made had a melt index of 0.481 degree/min., bulk density of 18.5 pounds per cubic foot, resin density of 0.917 g/cc, average particle size of 0.018 inch. The run showed a surprisingly decreased level of fines of 2.1 wt % when the run was stopped.

Example 2 Use of a Spray Capillary Tube as the Spray Nozzle. Supercritical Fluid Example A 20 cm long piece of 1/16" OD by 0.005" ID stainless steel tubing was silver soldered inside a piece of stainless steel ⅛" OD tubing for extra support. This ⅛"×0.005" tubing system was place about 3–5" into the gas phase reactor about 10.5" above the distributor plate. Around this tip between 2 and 5 pound per hour nitrogen flowed down the annular space between the capillary and a ¾" stainless steel tubing. The ¾" inch tubing extended 2¾ inches into the reactor. Around the ¾" tubing 1800 pounds per hour cycle gas flowed in the annular space between the ¾" inch tubing and a 1" ID stainless steel tubing. The 1" tubing extended 2" into the reactor.

The spray deliver apparatus was initially charged with 0.063 wt % indenyl tert-butyl corboxylate zirconium and 5.5 wt % modified methyl alumoxane catalyst, 7.6 wt % ethane and the bulk isopentane. The termperature of the fluid in the spray delivery system was set at 46° C. and the pressure set at 1000 psig. The reactor was initially started the same way as mentioned in Example 1.

The resin that was made had a melt index of 0.404 degree/min., bulk density of 12.3 pounds per cubic foot, resin density of 0.930 g/cc, average particle size of 0.0248 inch. Again this run showed a surprisingly decreased level of fines of 0.2 wt %.

Example 3 Use of Spray Capillary Tubing as the Spray Nozzle Supercritical Fluid Example A 20 cm long piece of ¹⁄₁₆" OD by 0.007" ID stainless steel tubing was silver soldered inside a piece of stainless steel ⅛" OD tubing for extra support. This ⅛"×0.007" tubing system was placed about 2¾" into the gas phase reactor about 10.5" above the distributor plate. Around this tip between 2 and 5 pound per hour nitrogen flowed down the annular space between the capillary and a ¾" stainless steel tubing. The ¾" inch tubing extended 2 inches into the reactor. Around the ¾" tubing 1800 pounds per hour cycle gas flowed in the annular space between the ¾ inch tubing and a 1" ID stainless steel tubing. The 1" tubing extended 2" into the reactor.

The spray delivery apparatus was initially charged with 0.16 wt % indenyl tert-butyl corboxylate zirconium and 8.9 wt % modified methyl alumoxane catalyst, 31 wt % ethane and the bulk isopentane. The temperature of the fluid in the spray delivery system was set at uncontrolled at ambient temperatures and was between 298K and 308K and the pressure set at 1000 psig. The reactor was initially started the same way as mentioned in Example 1.

The resin was made had a melt index of 0.833 degree/min., bulk density of 14.8 pounds per cubic foot, resin density of 0.926 g/cc, average particle size of 0.0337 inches and surprisingly showed a decreased level of fines of 0.7 wt %.

We claim:

1. A gas-phase polymerization of monomers comprising:
   a) introducing a monomer or monomers into a gas-phase reactor,
   b) introducing an unsupported polymerization catalyst system into the gas-phase reactor, wherein the unsupported polymerization catalyst system comprises:
      (i) a non-volatile materials fraction containing a polymerization catalyst;
      (ii) a solvent fraction which is at least partially miscible with the non-volatile materials fraction and which is sufficiently volatile to allow for the formation of polymerization catalyst particles when the mixture of the solvent fraction and the non-volatile materials fraction is sprayed into the reactor;
      (iii) a compressed fluid having a critical temperature between 273K and 505K and in its supercritical condition; and
      (iv) optionally a slowly vaporizing solvent; and
   c) recovering the polymer product.

2. The polymerization of claim 1 wherein the monomer or monomers are $C_2$ to $C_{10}$ linear or branched alkenes, dialkenes or trialkenes.

3. The polymerization of claim 2 wherein the monomers are ethene, propene, butene, pentene, hexene, octene or 1,3 butadiene.

4. The polymerization of claim 1 wherein the catalyst system contains at least one transition metal compound.

5. The polymerization of claim 4 wherein the catalyst system is a metallocene.

6. The polymerization of claim 1 wherein the solvent is a normal or branched alkanes less than $C_8$.

7. The polymerization of claim 1 utilizing a slow vaporizing solvent selected from the group consisting of normal alkanes greater than $C_8$, branched alkanes greater than $C_8$ and oxo-alkanes greater than $C_2$.

8. The polymerization of claim 1 wherein the compressed fluid is selected from the group consisting of carbon dioxide, nitrous oxide, ethane, propane, ethene, chlorotrifluoroethane, monofluoromethane, ammonia and xenon.

9. The polymerization of claim 1 wherein catalyst system is introduced into the reactor at a pressure of less than 10,000 psig.

10. The polymerization of claim 9 wherein the pressure is less than 3,000 psig.

11. The polymerization of claim 1 wherein the non-volatile materials fraction is greater than 0.01% by weight and less than 70% by weight of the polymerization catalyst system.

12. The polymerization of claim 11 wherein the non-volatile materials fraction is greater 1.0% and less than 40%.

13. The polymerization of claim 1 wherein the solvent fraction in the polymerization catalyst system is less than 95% by weight.

14. The polymerization of claim 1 wherein the amount of compressed fluid in the polymerization catalyst system is between 1% and 99.99% by weight.

15. The polymerization of claim 14 wherein the amount of compressed fluid in the polymerization catalyst system is between 5% and 99.9% by weight.

* * * * *